(12) United States Patent  (10) Patent No.: US 7,632,479 B2
Curren et al.  (45) Date of Patent: Dec. 15, 2009

(54) PROCESS FOR PRODUCING AMMONIA AND SULFURIC ACID FROM A STREAM COMPRISING AMMONIUM SULFATE

(75) Inventors: Meredith Curren, Ottawa (CA); Brian Foody, Ottawa (CA); Jeff Tolan, Ottawa (CA)

(73) Assignee: Iogen Energy Corporation, Ontario (CA)

( * ) Notice: Subject to any disclaimer, the term of this patent is extended or adjusted under 35 U.S.C. 154(b) by 142 days.

(21) Appl. No.: 11/846,758

(22) Filed: Aug. 29, 2007

(65) Prior Publication Data

US 2008/0056983 A1   Mar. 6, 2008

Related U.S. Application Data

(60) Provisional application No. 60/824,142, filed on Aug. 31, 2006.

(51) Int. Cl.
*C01B 17/69* (2006.01)
*C01B 17/96* (2006.01)
*C01C 1/00* (2006.01)

(52) U.S. Cl. .................. 423/356; 423/522; 423/545; 127/37

(58) Field of Classification Search ............. 423/356, 423/522, 545; 127/37
See application file for complete search history.

(56) References Cited

U.S. PATENT DOCUMENTS

| 304,260 | A | * | 8/1884 | Carey et al. ............... 423/356 |
| 3,282,646 | A | | 11/1966 | Bonfield, et al. |
| 3,383,170 | A | * | 5/1968 | Furkert et al. ............. 423/356 |
| 3,674,427 | A | * | 7/1972 | Welty Jr. ................. 423/356 |
| 3,816,603 | A | * | 6/1974 | Welty ..................... 423/520 |
| 3,862,247 | A | | 1/1975 | Greco |
| 3,911,092 | A | * | 10/1975 | Bretherick ............... 423/520 |
| 3,933,925 | A | | 1/1976 | Greco |
| 4,081,515 | A | | 3/1978 | Gruhier et al. |
| 4,371,512 | A | | 2/1983 | Sardisco et al. |
| 4,461,648 | A | | 7/1984 | Foody |
| 4,490,347 | A | | 12/1984 | Gelblum |

(Continued)

FOREIGN PATENT DOCUMENTS

DE   1 151 492   *   7/1963

(Continued)

OTHER PUBLICATIONS

Halstead, "Thermal Decomposition of Ammonium Sulphate", J. Appl. Chem. vol. 20 (1970) 129-32.

(Continued)

*Primary Examiner*—Timothy C Vanoy
(74) *Attorney, Agent, or Firm*—Fitzpatrick, Cella, Harper & Scinto

(57) ABSTRACT

A process for producing ammonia and sulfuric acid from a stream comprising ammonium sulfate is provided. The process comprises the steps of heating the stream to produce ammonia and a decomposition product comprising one or more than one of a bisulfate salt, a pyrosulfate salt, or a combination thereof. The ammonia produced is recovered, and water is added to the decomposition product to produce a stream comprising the decomposition product. The stream comprising the decomposition product is processed by acid retardation to obtain a sulfuric acid stream and a stream comprising one or more than one sulfate salt.

53 Claims, 4 Drawing Sheets

U.S. PATENT DOCUMENTS 5,500,098 A 3/1996 Brown et al.
2004/0234441 A1 * 11/2004 Hansen ...................... 423/356

FOREIGN PATENT DOCUMENTS

EP 0 083 831 A1 * 7/1983
WO 03/027018 4/2003

OTHER PUBLICATIONS

Kiyoura, et al., "Mechanism, Kinetics, and Equilibrium of Thermal Decomposition of Ammonium Sulfate", Ind. Eng. Chem. Process Des. Develop, vol. 9, No. 4 (1970) 489-94.

Liske, et al., "Evaluation of Combustion Processes for Production of Feedstock Chemicals From Ammonium Sulfate and Ammonium Bisulfate", J. Hazardous Substance Research, vol. 2 (2000) 8-1 - 8-17.

Dugger, et al., "Ammonium Sulfate Decomposition; United States Atomic Energy Commission", RMO2036 (1955) 6.

LeCaptain, Webpage, Central Michigan University, Mount Pleasant, MI, Department of Chemistry; http://www.cst.cmich.edu/units/chm/people/D_Lecaptain.htm, dated 2007.

* cited by examiner

PROCESS FOR PRODUCING AMMONIA AND SULFURIC ACID FROM A STREAM COMPRISING AMMONIUM SULFATE

This application claims benefit of U.S. Provisional Application No. 60/824,142.

FIELD OF THE INVENTION

The present invention relates to a process for the production of ammonia and sulfuric acid. More specifically, the invention relates to the production of ammonia and sulfuric acid from a stream comprising ammonium sulfate.

BACKGROUND OF THE INVENTION

The compound ammonium sulfate is a byproduct of several industrial processes. One such process is the production of the chemical hydroquinone from the hydrolysis of p-aminophenol by ammonium bisulfate (Greco, U.S. Pat. No. 3,862,247). Another such process is the production of the chemical methyl resorcinol from the hydrolysis of toluene diamine by ammonium bisulfate (Greco, U.S. Pat. No. 3,933,925). Ammonium sulfate is also a byproduct in the production of caprolactam, which is a monomer for nylon-6 production (Bonfield, U.S. Pat. No. 3,282,646).

Another process that produces an ammonium sulfate byproduct is the production of biofuels or chemicals from cellulose-containing feedstocks, such as agricultural wastes, grasses, and forestry wastes. The most common process for producing biofuels or chemicals from cellulose involves breaking down the fibrous material with pretreatment, followed by a nearly complete conversion of the cellulose to glucose by using cellulase enzymes. In the pretreatment process, steam and sulfuric acid are typically used to hydrolyze the hemicellulose to xylose, arabinose, mannose, galactose, acetic acid, glucuronic acid, formic acid, and galacturonic acid. The pretreatment does not hydrolyze a large portion of the cellulose, but rather increases the cellulose surface area as the fibrous feedstock is converted to a muddy texture. The pretreated cellulose is then hydrolyzed to glucose in a subsequent step of enzymatic hydrolysis that uses cellulase enzymes. The glucose is then fermented by yeast or bacteria to produce biofuels such as ethanol or butanol, or chemicals such as lactic acid.

Prior to the addition of cellulase enzymes to the pretreated feedstock, the pH of the acidic feedstock is adjusted to a value that is suitable for the enzymatic hydrolysis reaction. Typically, this involves the addition of alkali to a pH of between about 4 to about 6, which is the optimal pH range for cellulases, although the pH can be higher if alkalophilic cellulases are used. The pH can, in principle, be adjusted with any base, but, in practice, ammonium hydroxide is the most desirable. The adjustment of the pH with ammonia or ammonium hydroxide produces ammonium sulfate salt. Alternatively, ammonia or ammonium hydroxide can neutralize sulfuric acid in other steps of the process, thereby producing ammonium sulfate.

An alternative pretreatment is ammonia fiber explosion (often known as AFEX) in which the feedstock is subjected to concentrated ammonia at high pressure. The ammonia is released quickly by explosive decompression and recovered. The ammonia residue within the pretreated fiber results in ammonium sulfate when sulfuric acid is used to adjust the pH to 4 to 6 prior to enzymatic hydrolysis.

Ammonium sulfate is an important chemical in the fertilizer industry. In some geographic regions, an ammonium sulfate byproduct from a chemical process can be sold as fertilizer. However, in regions where ammonium sulfate fertilizer usage is limited, excess ammonium sulfate must be disposed of. In such cases, it is much more desirable to recover ammonia and sulfuric acid from the ammonium sulfate.

Greco (U.S. Pat. Nos. 3,862,247 and 3,933,925) describes the conversion of ammonium sulfate to ammonia and ammonium bisulfate. This is carried out by heating ammonium sulfate to a temperature of 310° C. to 450° C. At temperatures above 450° C., the ammonium bisulfate decomposes. After heating for a few minutes at 330° C., 75% to 95% of the ammonium sulfate is converted to ammonium bisulfate. The ammonia is recovered and used in other processes. Greco's process recovers half of the ammonia in the ammonium sulfate, and produces ammonium bisulfate. However, the process does not recover sulfuric acid and the ammonia yield is relatively low (50%).

Halstead (J. Appl. Chem., 1970, 20:129-132) describes the decomposition of ammonium sulfate at 400° C. The first reaction converts ammonium sulfate to ammonium bisulfate and ammonia. In a second reaction, the ammonium bisulfate dehydrates to form a water molecule and ammonium pyrosulfate, $(NH_4)_2S_2O_7$. Further heating of the ammonium pyrosulfate to form sulfur dioxide and nitrogen, which are not desired products from ammonium sulfate, is also carried out.

D. J. LeCaptain (Central Michigan University), reports the conversion of ammonium sulfate to ammonia and ammonium bisulfate by heating. The process described (see: http://72.14.253.104/search?q=cache:h6w1_ixVZNEJ:www.cst.c-mich.edu/units/chm/people/D_Lecaptain.htm+cst.c-mich.edu/units/chm/people/D_Lecaptain.htm&hl=en&ct=clnk&cd=1&gl=ca) does not recover more than 50% of the ammonia, and does not recover sulfuric acid.

U.S. Pat. No. 3,282,646 (Bonfield) discloses the production of ammonia and sulfur dioxide from ammonium sulfate. The ammonium sulfate was heated to 250° C. to drive off ammonia and produce ammonium bisulfate. The temperature was increased to 450° C. and carbon monoxide, hydrogen sulfide, hydrogen, or nitrogen was bubbled through the molten salt. The reaction produced ammonia and sulfur dioxide, the latter being an undesirable byproduct.

Kiyoura and Urano (Ind. Eng. Chem. Process Des. Develop., 1970, 9(4):489-494) describes the thermal decomposition of ammonium sulfate to ammonia, sulfur dioxide, sulfur trioxide and other gases. Kiyoura states that the simple decomposition of ammonium bisulfate to sulfuric acid and ammonia is not an adequate mechanism to describe the thermal decomposition reaction.

Liske et al. (Journal of Hazardous Substance Research, 2000, 2:8.1-8.17) teach the complete thermal decomposition of ammonium sulfate to several gaseous products. This combustion process does not recover ammonia and sulfuric acid.

Dugger et al. (Ammonium Sulfate Decomposition, 1955, RMO-2036, United States Atomic Energy Commission) describes the thermal decomposition of ammonium sulfate in the presence of zinc oxide. The reaction products are ammonia and sulfur dioxide.

U.S. patent application 20040234441 (Hansen) describes heating a mixture of ammonium sulfate and sulfuric acid in a ratio of 1:2 to 285° C. to decompose the mixture to ammonia and sulfuric acid. The temperature is maintained below 290° C. to avoid boiling of the sulfuric acid. A disadvantage of this process is that the temperature must be controlled in such a narrow range.

U.S. Pat. No. 4,081,515 (Gruhier) carries out the decomposition of ammonium bisulfate by heating it to 400° C. The heating is carried out without a catalyst present or with copper, molybdenum, or tungsten catalyst present. The primary product is sulfur dioxide, which is not desired in the recovery of ammonia and sulfuric acid.

U.S. Pat. No. 4,490,347 (Gelblum) describes the production of oleum (sulfuric acid containing sulfur trioxide) from a mixture of ammonium bisulfate and sulfuric acid, by pyrolyzing the mixture in the presence of oxygen. The production of oleum is not desirable in the recovery of ammonia and sulfuric acid from ammonium sulfate.

Huter (German Patent 1,151,492) describes the production of ammonia and sulfuric acid from ammonium sulfate or ammonium bisulfate. The process starts by adding potassium sulfate to ammonium bisulfate in a 1:1 molar ratio and heating the mixture at 350° C. This drives off the ammonia and produces potassium bisulfate. The potassium bisulfate is then heated in a second stage to a temperature range between 600° C. and 650° C. to liberate sulfur trioxide, which is combined with water to make sulfuric acid, and potassium sulfate. Although Huter's process produces ammonia and sulfuric acid from ammonium sulfate, the high temperature of the second stage reaction requires a large amount of energy, and the sulfur trioxide and any ammonium sulfate or ammonium bisulfate carried through to this point are unstable. These disadvantages have limited the adoption of Huter's process.

Therefore, a satisfactory process for the recovery of ammonia and sulfuric acid from ammonium sulfate is lacking. The ability to recover these compounds from ammonium sulfate represents a large opportunity to avoid the cost of disposal of ammonium sulfate and to lower process costs by reusing or selling ammonia and sulfuric acid.

SUMMARY OF THE INVENTION

The present invention relates to a process for the production of ammonia and sulfuric acid. More specifically, the present invention relates to the production of ammonia and sulfuric acid from a stream comprising ammonium sulfate.

It is an object of the invention to provide an improved method for the production of ammonia and sulfuric acid from a stream comprising ammonium sulfate.

According to the present invention, there is provided a process (A) for producing ammonia and sulfuric acid from a first stream comprising ammonium sulfate, the process comprising the steps of:

(i) heating the first stream comprising ammonium sulfate thereby producing ammonia and a decomposition product comprising a sulfate salt selected from the group consisting of bisulfate salt, a pyro sulfate salt and a combination thereof;

(ii) recovering the ammonia produced in step (i);

(iii) adding water to the decomposition product produced in step (i) to produce a second stream comprising a sulfate salt, a bisulfate salt, sulfuric acid or a combination thereof;

(iv) separating sulfate salt from sulfuric acid in the second stream produced in step (iii) to obtain a third stream comprising sulfuric acid and a fourth stream comprising one or more than one sulfate salt, wherein said separating comprises acid retardation; and (v) recovering the sulfuric acid obtained in step (iv).

The present invention also pertains to the process (A) as defined above, wherein the first stream comprising ammonium sulfate is a product produced from pretreatment of a lignocellulosic feedstock with sulfuric acid and wherein sulfate present in the first stream comprising ammonium sulfate originates, in whole or in part, from sulfuric acid added during the pretreatment. The ammonia produced in step (i) may be used for pH adjustment of the stream produced by sulfuric acid pretreatment of the lignocellulosic feedstock. The sulfuric acid recovered in step (v), or a portion thereof, may be re-used in the pretreatment of the lignocellulosic feedstock.

The present invention also relates to the process (A) as defined above, wherein the first stream comprising ammonium sulfate is a product produced from pretreatment of a lignocellulosic feedstock with ammonia and wherein ammonia present in the first stream comprising ammonium sulfate originates, in whole or in part, from ammonia added during the pretreatment. The sulfuric acid recovered in step (v) may be used for pH adjustment of the stream (the first stream) produced by ammonia pretreatment of the lignocellulosic feedstock. The ammonia recovered in step (ii), or a portion thereof, may be re-used in the pretreatment of the lignocellulosic feedstock.

The present invention also relates to the process (A) as defined above, wherein the one or more than one sulfate salt produced in step (iv), or a portion thereof, is added to the first stream comprising ammonium sulfate in the step of heating (step (i)).

The present invention also relates to the process (A) as defined above, wherein the first stream comprising ammonium sulfate further comprises a sulfate salt selected from the group consisting of potassium sulfate, sodium sulfate, magnesium sulfate, calcium sulfate and a combination thereof. Preferably, the sulfate salt comprises ammonium sulfate or potassium sulfate.

The present invention also relates to the process (A) as defined above, wherein the decomposition product produced in step (i) comprises a pyrosulfate salt, which pyrosulfate salt is selected from the group consisting of ammonium pyrosulfate, potassium pyrosulfate, sodium pyrosulfate, magnesium pyrosulfate, calcium pyrosulfate and a combination thereof. Preferably, the pyrosulfate salt comprises ammonium pyrosulfate or potassium pyrosulfate.

The present invention also relates to the process (A) as defined above, wherein the one or more than one sulfate salt in step (iv) is selected from the group consisting of ammonium sulfate, potassium sulfate, magnesium sulfate, calcium sulfate and a combination thereof. Preferably, the one or more than one sulfate salt in step (iv) comprises ammonium sulfate or potassium sulfate.

The present invention also relates to the process (A) as defined above, wherein the step of heating the first stream comprising ammonium sulfate is carried out at a temperature of between about 300° C. and about 450° C.

The present invention also relates to the process (A) as defined above, wherein the first stream comprising ammonium sulfate is a product produced from acid hydrolysis of a lignocellulosic feedstock with sulfuric acid and wherein sulfate present in the first stream comprising ammonium sulfate originates, in whole or in part, from sulfuric acid added during the acid hydrolysis.

The process of the invention produces both ammonia and sulfuric acid from a stream comprising ammonium sulfate (the first stream). This is an improvement over prior art processes which produce ammonia and ammonium bisulfate, ammonia and sulfur dioxide, or ammonia and ammonium pyrosulfate from ammonium sulfate. The process of the invention provides for the recovery or reuse ammonia and sulfuric acid, which allows more operating flexibility in avoiding the disposal of ammonium sulfate. The process also avoids the very high temperatures employed in the process of German Patent 1,151,492 (Huter).

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF THE INVENTION

Figure 1:
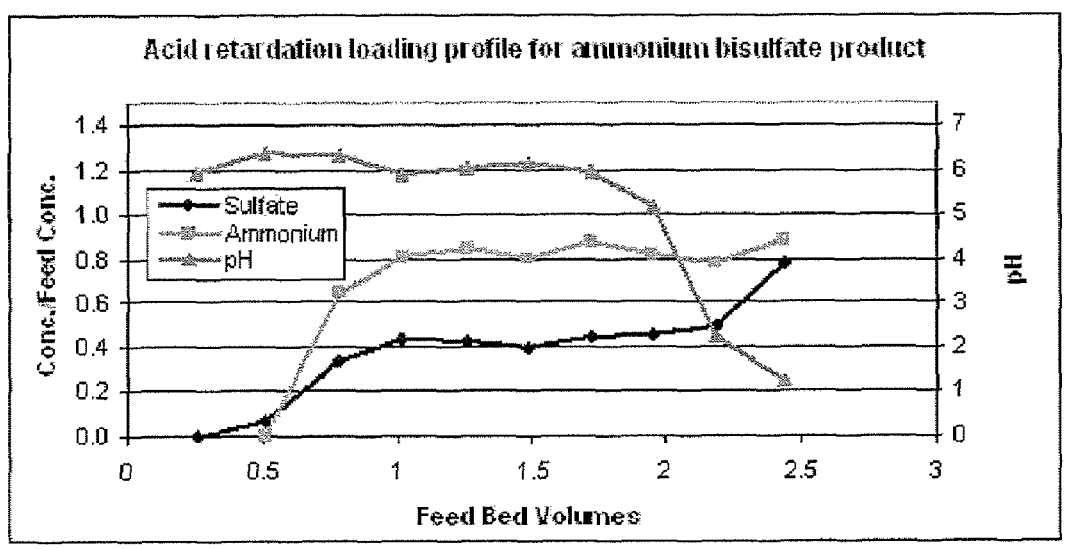
FIG. 1 shows the sulfate, ammonium and pH loading profiles from a column utilized in an acid retardation process comprising a strong anion exchange resin with ammonium bisulfate as the feed. The feed was stopped upon breakthrough of sulfuric acid. The ammonium bisulfate was produced by thermal decomposition of ammonium sulfate to produce ammonium pyrosulfate, which was subsequently hydrated to produce the ammonium bisulfate.

The present invention relates to a process for the production of ammonia and sulfuric acid. More specifically, the present invention relates to the production of ammonia and sulfuric acid from a stream comprising ammonium sulfate.

The following description is of preferred embodiments by way of example only and without limitation to the combination of features necessary for carrying the invention into effect.

The invention provides a process (A) for producing ammonia and sulfuric acid from a first stream comprising ammonium sulfate, the process comprising the steps of:

(i) heating the first stream comprising ammonium sulfate thereby producing ammonia and a decomposition product comprising a sulfate salt selected from the group consisting of bisulfate salt, a pyrosulfate salt and a combination thereof;

(ii) recovering the ammonia produced in step (i);

(iii) adding water to the decomposition product produced in step (i) to produce a second stream comprising a sulfate salt, a bisulfate salt, sulfuric acid or a combination thereof;

(iv) separating sulfate salt from sulfuric acid in the second stream produced in step (iii) to obtain a third stream comprising sulfuric acid and a fourth stream comprising one or more than one sulfate salt, wherein said separating comprises acid retardation; and (v) recovering the sulfuric acid obtained in step (iv).

The sulfate in the ammonium sulfate stream may originate from sulfuric acid added during pretreatment of a lignocellulosic feedstock.

Lignocellulosic feedstocks comprise at least 20% cellulose and at least 15% lignin. This term is meant to include any type of plant biomass such as, but not limited to, non-woody plant biomass; cultivated crops such as grasses, for example, C4 grasses, such as switch grass, cord grass, rye grass, miscanthus, reed canary grass, or a combination thereof; sugar processing residues, for example, baggase, beet pulp, or a combination thereof, agricultural residues, for example, soybean stover, corn stover, rice straw, rice hulls, barley straw, corn cobs, wheat straw, canola straw, oat straw, oat hulls, corn fiber, or a combination thereof; and forestry biomass, for example, recycled wood pulp fiber, sawdust, hardwood, for example, aspen wood, softwood, or a combination thereof. Furthermore, the lignocellulosic feedstock may comprise cellulosic waste material or forestry waste materials such as newsprint, cardboard and the like.

In a typical acidic pretreatment process, steam and sulfuric acid are used at 185° C. to 260° C., or any amount therebetween, at pH 0.4 to 2.0, or any amount therebetween, for a period of 5 seconds to 120 minutes, or any amount therebetween, to hydrolyze the hemicellulose to xylose, arabinose, mannose, galactose, acetic acid, glucuronic acid, formic acid, and galacturonic acid. An example of such a pretreatment process is described in U.S. Pat. No. 4,461,648 (Foody; which is incorporated herein by reference). The pretreatment does not hydrolyze a large portion of the cellulose, but rather increases the cellulose surface area as the fibrous feedstock is converted to a muddy texture. The pretreated cellulose is then hydrolyzed to glucose in a subsequent step of enzymatic hydrolysis that uses cellulase enzymes. The glucose is then fermented by yeast or bacteria to produce biofuels, such as ethanol or butanol, or other chemicals such as lactic acid.

The present invention further contemplates a basic pretreatment. This can be carried out by ammonia fiber explosion (often known as AFEX). In this case, the feedstock is subjected to concentrated ammonia at high pressure.

Prior to the addition of cellulase enzymes to the pretreated feedstock, the pH of the pretreated feedstock is adjusted to a value that is suitable for the enzymatic hydrolysis reaction. Typically, this involves the addition of alkali or acid (depending upon whether acidic or basic pretreatment is employed) to attain a pH of between about 4 to about 6, or any amount therebetween, which is the optimal pH range for cellulases, although the pH can be higher if alkalophilic cellulases are used.

In the case of a pretreatment carried out with sulfuric acid, the pH can, in principle, be adjusted with any base, but, in practice, ammonia or ammonium hydroxide is the most desirable. The adjustment of the pH with ammonia or ammonium hydroxide produces ammonium sulfate salt. Alternatively, ammonia or ammonium hydroxide can neutralize sulfuric acid in other steps of the process, thereby producing ammonium sulfate.

In the case of a pretreatment carried out with ammonia, the pH can be adjusted with sulfuric acid to produce ammonium sulfate. As in the acidic pretreatment step, the sulfuric acid can neutralize the ammonia in other steps of the process to produce ammonium sulfate.

The present invention also contemplates carrying out acid hydrolysis on a lignocellulosic feedstock. Similar to pretreatment, acid hydrolysis typically involves subjecting the feedstock to acid and steam. However, in this case, the temperature, acid concentration and length of time of the hydrolysis are sufficient to substantially hydrolyze both the cellulose and hemicellulose present in the feedstock to their monomeric constituents, which is glucose from cellulose and xylose, galactose, mannose and arabinose from hemicellulose. Sulfuric acid is the most common mineral acid utilized in this process. The sulfuric acid can be concentrated (25-80% w/w, or any amount therebetween) or dilute (3-8% w/w, or any amount therebetween) measured as the weight of acid in the weight of acidified aqueous solution that is present with the feedstock. The aqueous solution is separated from the fiber solids to produce a sugar hydrolyzate stream.

The sugar hydrolyzate stream produced by acid hydrolysis may be neutralized with ammonia or ammonium hydroxide to produce a stream comprising ammonium sulfate (the first stream). This pH adjustment is generally carried out prior to a step of fermentation. A portion, or all of the sugars may be present within the first stream.

In an embodiment of the invention, the stream comprising ammonium sulfate may substantially comprise, or consist entirely of, the compound ammonium sulfate. Ammonium sulfate is a solid at ambient temperature and melts at a temperature of about 230° C. The compound is molten at the typical temperatures used in the thermal decomposition reaction.

The ammonium sulfate may be dissolved or slurried in water. A saturated solution of ammonium sulfate in water at 100° C. is 50.4% (w/w) ammonium sulfate. Ammonium sulfate may be fully dissolved in water or may be supersaturated in water prior to the thermal decomposition. However, it should be appreciated that the invention is not limited by the concentration of ammonium sulfate present in the ammonium sulfate stream (the first stream).

Prior to the heating step (thermal degradation), the ammonium sulfate may exist in its stoichiometric form, $(NH_4)_2SO_4$, that is, 2.0 moles of ammonium ($NH_4^+$) per mole of sulfate ($SO_4^{-2}$). However, if the ammonium sulfate arises from the addition of ammonia and sulfuric acid at different locations in a process, an excess of ammonium or sulfate may be present, and the molar ratio of ammonium to sulfate may differ from the stoichiometric ratio.

Preferably, the ratio of sulfuric acid to ammonium sulfate present in the first stream comprising ammonium sulfate is between 0.0 and less than 0.5 (w/w), or any amount therebetween. For example, the weight ratio of sulfuric acid to ammonium sulfate may be 0.45, 0.40, 0.35, 0.30, 0.25, 0.20, 0.15, 0.10, 0.05 or 0.0 (w/w), or any amount therebetween.

Cations other than $NH_4^+$, including, but not limited to, potassium ($K^+$), calcium ($Ca^{+2}$), magnesium ($Mg^{+2}$) and sodium ($Na^+$) may be present in the ammonium sulfate stream. The presence of these cautions results in finite concentrations of their respective sulfate salts, namely potassium sulfate, calcium sulfate, magnesium sulfate and sodium sulfate in the ammonium sulfate stream (first stream).

Anions other than sulfate may be present in the ammonium sulfate stream. For example, the presence of anions, such as chloride ($Cl^{-1}$) or phosphate ($PO_4^{-3}$), results in ammonium salts and potentially other cationic salts of these of these anions in the first (ammonium sulfate) stream.

The heating of the first stream produces ammonia and a decomposition product comprising one or more than one of a bisulfate salt, a pyrosulfate salt, or a combination thereof. In carrying out the thermal decomposition, the ammonium sulfate (first) stream is preferably heated to a temperature of 300° C. to 450° C., or any temperature range therebetween. For example, the ammonium sulfate stream may be heated to a temperature of about 300, 315, 320, 325, 340, 350, 360, 375, 400, 425 or 450° C., or any temperature therebetween. More preferably, the temperature is 315° C. to 375° C., or any temperature range therebetween. The thermal decomposition may be carried out in a batch reactor, in a continuous reactor, or in a series of continuous reactors. The invention also contemplates carrying out the thermal degradation reaction under vacuum.

The thermal degradation reaction is carried out for a time sufficient to convert all or a portion of the ammonium sulfate to a decomposition product. In a preferred embodiment, the thermal decomposition reaction is carried out for about 0.1 minute to about 100 minutes, or any range therebetween. In a more preferred embodiment, the thermal decomposition reaction is carried out for a period of about 0.5 minutes to about 10 minutes, or any range therebetween. For example, the thermal decomposition reaction may be carried out for 0.1, 0.5, 1, 5, 10, 20, 30, 40, 50, 60, 70, 80, 90 or 100 minutes, or any range therebetween.

In another embodiment, organic compounds, such as sugars or organic acids, are present in the ammonium sulfate (first) stream. These compounds are vaporized or converted into insoluble char in the thermal decomposition reaction, and may be separated from the decomposition products by dissolving the decomposition products in water or an aqueous solution.

Water and other volatile compounds present in the ammonium sulfate (first) stream may be driven off by heating either in a separate operation prior to thermal decomposition or in the thermal decomposition reaction vessel itself.

When the first (ammonium sulfate) stream is substantially composed of ammonium sulfate, the decomposition product comprises ammonium bisulfate, ammonium pyrosulfate, or a mixture of the two compounds. As reported by Halstead (J. Appl. Chem., 1970, 20:129-132), the thermal decomposition of ammonium sulfate produces ammonia and ammonium bisulfate. The ammonium bisulfate can then undergo dehydration to form ammonium pyrosulfate. However, the practice of the invention is not limited by the relative amounts of ammonium bisulfate and ammonium pyrosulfate in the decomposition product.

When other sulfate salts such as potassium sulfate, sodium sulfate, magnesium sulfate, calcium sulfate, or a combination thereof, are present in the ammonium sulfate (first) stream, these salts are generally not volatile at the conditions of ammonium sulfate decomposition. German Patent 1,151,492 (Huter) teaches that the presence of a 1:1 molar ratio of potassium sulfate to ammonium bisulfate results in all of the ammonia being driven off in the thermal decomposition reaction. The sulfate salts of potassium, sodium, magnesium, or calcium present prior to thermal decomposition exist, at least in part, as the bisulfate or pyrosulfate salts after thermal decomposition.

The bisulfate salts of potassium, sodium, magnesium and calcium have a wide range of melting points, but in many cases are molten liquids at the conditions of thermal decomposition. Potassium bisulfate has a melting point of 197° C. and sodium bisulfate has a melting point of 315° C.

The ammonia liberated in the thermal decomposition is recovered. As used herein, "recovery" of ammonia includes, but is not limited to, (1) adding the ammonia directly to a process step carried out upstream or downstream of the thermal decomposition process, or (2) direct recovery of the ammonia stream. The direct addition of the ammonia to the process can be employed as a means to control the pH at one or more stage in the process, as a regenerant in an ion exchange system to regenerate a resin, as a feed to amination reactions, or other stages in a process that uses ammonia. The direct recovery of the ammonia stream can be by scrubbing with water, at ambient or elevated pressure, or by compression of the ammonia followed by sparging of the compressed ammonia into water. Alternatively, the ammonia can be compressed and stored in a tank. It will be appreciated that the practice of the invention is not limited by the method of ammonia recovery.

At the conclusion of the thermal decomposition reaction, solids or molten liquid comprising the decomposition product are removed from the reactor or allowed to cool in the reactor. In either case, water is added to the decomposition product to produce a second stream. With ammonium sulfate as the primary compound in the ammonium sulfate (first) stream, the addition of water converts preferably all or most of the ammonium pyrosulfate which may be present to ammonium bisulfate. With other sulfate salts present in the ammonium sulfate stream, the corresponding pyrosulfate salts, if present, are converted into bisulfate salts. Without wishing to be bound by theory, when water is added to the decomposition product, salts may be formed in equilibrium with ammonium sulfate and sulfuric acid.

Preferably, the decomposition product is cooled down to a temperature below 100° C. prior to the addition of water.

After water addition, the decomposition product (the second stream) is processed to obtain sulfuric acid. This is carried out by acid retardation is carried to obtain sulfuric acid from the decomposition product.

The amount of water added to the decomposition product is preferably sufficient to achieve a solution with a dissolved solids concentration of about 25 g/L to about 500 g/L, or any range therebetween. For example, the amount of water added results in a dissolved solids concentration of about 50 g/L to about 300 g/L, or any concentration range therebetween. In another example, the amount of water added results in a dissolved solids concentration of about 100 g/L to about 250 g/L, or any concentration range therebetween. The dissolved solids may be at a concentration of about 25, 50, 75, 100, 125, 150, 175, 200, 225, 250, 275, 300, 325, 350, 375, 400, 425, 450, 475, and 500 g/L, or any amount therebetween When ammonium sulfate is the primary compound in the ammonium sulfate stream, the decomposition product comprises ammonium bisulfate dissolved in water after water addition. However, it will be appreciated that the hydrated decomposition product may comprise ammonium and sulfate ions in a ratio that differs from the exact stoichiometric ratio of 1.0 that is present in ammonium bisulfate. In practicing the invention, the molar ratio of ammonium ions to sulfate ions can differ from unity simply due to an excess of ammonium or sulfate ions.

When significant amounts of sulfate salts other than ammonium sulfate are present in the ammonium sulfate stream, the decomposition product may comprise other bisulfate salts dissolved in water after water addition. The hydrated decomposition product may comprise cations and sulfate ions in a ratio that differs from the exact stoichiometric ratio of 1.0 that is present in bisulfate salts. In practicing the invention, the molar ratio of cations to sulfate ions can differ from unity simply due to an excess of cations or sulfate ions.

Acid retardation separates the hydrated decomposition product (the second stream) into a third stream comprising sulfuric acid, and a forth stream comprising one or more than one sulfate salt. As used herein, "acid retardation" means a process for the separation of sulfuric acid from metal salts that uses one or more strong base anion exchange resins. The resins might also include a weak acid cation functionality within the same resin. In this case, the resins are known as amphoteric when they include both functionalities. Either resin type causes strong acids to bind preferentially to the resin while the resin has little or no affinity for salts. The movement of strong acids through the resin is thus "retarded" by their high affinity and results in a separation of the acid from the salt. The strong acids are then desorbed with water or an aqueous solution. Without wishing to be bound by theory, the separation of strong acids from salts is thought to be caused by the Donnan effect. Examples of commercial acid retardation resins are Dowex 1×4, which is a strong base anion exchange resin with quaternary ammonium functionality, and Dowex Retardion 11A8, which is an amphoteric resin combining quaternary ammonium functionality with carboxylic acid functionality.

In practicing the invention with ammonium sulfate as the primary compound in the ammonium sulfate (first) stream, the decomposition product (second stream) comprising ammonium bisulfate is fed as an aqueous solution to the acid retardation resin contained in a chromatography column. In a preferred embodiment, the resin is contained in a packed column.

In a preferred embodiment, the acid retardation feed streams, column and resin are maintained at a temperature of 20° C. to 90° C., or any temperature range therebetween. For example, the temperature may be 40° C. to 70° C., or any temperature range therebetween, or 20, 25, 30, 35, 40, 45, 50, 55, 60, 65, 70, 75, 80, 85 and 90° C., or any temperature therebetween. However, it will be appreciated by those of skill in the art that higher temperatures may be used if high temperature resins are employed.

When the ammonium bisulfate is fed to the column for the purpose of acid recovery, sulfuric acid is sorbed onto the resin while substantially most of ammonium sulfate passes through the column with low affinity. The feed is usually stopped once the maximum amount of sulfuric acid is taken up by the resin. The resin is then washed by feeding water to the column, which desorbs the sulfuric acid. The water wash may be co-current, counter-current or cross-current to the feeding step. The sulfuric acid (third) stream is collected as the acid product stream.

When potassium, magnesium, sodium, or calcium sulfate salts are present in the ammonium sulfate stream, the corresponding bisulfate salts of these compounds are present in the feed to acid retardation. The corresponding sulfate salts (potassium sulfate, sodium sulfate, magnesium sulfate, and calcium sulfate) elute more quickly than the acid, as these compounds have a low affinity for the resin and are not sorbed to the resin. These sulfate salts are present along with ammonium sulfate in the eluted salt stream (the fourth stream). The sulfuric acid sorbs onto the resin, as with an ammonium bisulfate feed, and is subsequently desorbed with water or an aqueous solution.

All or a portion of the sulfate salt (fourth stream) produced in the separating step (step (iv)), using acid retardation, may be returned to the feed or heating process in step (i) and subjected to the thermal decomposition reaction. If this sulfate salt comprises a significant fraction of ammonium sulfate, then by carrying this out, the conversion of ammonium sulfate to sulfuric acid and ammonia can achieve a very high yield. If the sulfate salt is another sulfate salt, such as potassium sulfate, then reuse of the salt might also be beneficial in the conversion of ammonium sulfate to sulfuric acid and ammonia, for example but not wishing to be bound by theory, by helping to drive off ammonia.

The sulfuric acid produced in step (iv), from the third stream, is recovered. It may be recovered simply by collecting the acid as it elutes from the acid retardation column. Alternatively, the sulfuric acid stream may be concentrated by evaporation or other means. The sulfuric acid stream may be stored, or added directly to the process for pH adjustment, reaction catalysis, or used for other purposes.

In a preferred embodiment, the invention is practiced as part of a process for the conversion of a lignocellulosic feedstock to glucose which comprises pretreatment followed by enzymatic hydrolysis. In this embodiment, the sulfuric acid recovered in step (iv), or a portion thereof, from the third stream, is subsequently used in the pretreatment process.

The present invention will be further illustrated in the following examples. However, it is to be understood that these examples are for illustrative purposes only, and should not be used to limit the scope of the present invention in any manner.

EXAMPLES

Example 1

Thermal Decomposition of Ammonium Sulfate to Ammonia and Decomposition Product A mass of 20.04 grams of dry ammonium sulfate was placed in a 500 ml round bottom flask. The flask was placed in an electric heating mantle, and a layer of ¼ inch of sand was placed between the flask and the heating mantle. A thermocouple was placed within the layer of sand but was calibrated during previous experiments to indicate the temperature of the ammonium sulfate. The pH of the vapor exiting the neck of the flask was monitored.

The mantle was turned on and the temperature rose to 350° C. in 20 minutes. At this point, the ammonium sulfate solids appeared to be melting. The pH of the vapor was 11, indicating ammonia was driven off. The temperature was slowly increased to 375° C. over the following 52 minutes (72 minutes from the start of the experiment). The contents of the flask started to boil at 30 minutes from the start of the experiment. The pH of the vapor reached a high of pH 11.8 35 minutes into the experiment and slowly dropped to pH 9 after 72 minutes from the start of the experiment. At this point, the pH dropped sharply to pH 5, indicating the production of $SO_2$ which can combine with water and possibly oxygen to form an acid. The experiment was terminated at this point by removing the flask from the heating mantle.

The flask contents lost 4.53 g which was 22.6% of the starting mass of ammonium sulfate. Analysis of the final product for ammonium and sulfate content by ion exchange chromatography methods indicated that 46.8% to 54.8% of the ammonia was driven off, and there was negligible loss of sulfate. The loss of ammonia represents 12.8% to 14.9% of the initial mass of ammonium sulfate. The remaining mass loss of 7.7% to 9.8% of the ammonium sulfate is the loss of water in the dehydration of ammonium bisulfate to ammonium pyrosulfate. The complete dehydration of ammonium bisulfate to ammonium pyrosulfate requires a loss of 7.8% of the mass of the ammonium bisulfate. This is in the range obtained in this experiment, which suggests that the decomposition product was nearly entirely ammonium pyrosulfate.

The decomposition product was dissolved in water at a concentration of 30% (w/v), which hydrates the ammonium pyrosulfate to ammonium bisulfate. The pH of the 30% (w/w) dissolved product was pH 0.61, which is close to the pH of 30% (w/v) ammonium bisulfate dissolved in water (pH 0.63), and far from pH 5.53 of 30% (w/v) ammonium sulfate.

Example 2

Acid Retardation Treatment of Ammonium Bisulfate to Produce Sulfuric Acid and Ammonium Sulfate An acid retardation column was packed with a Dowex 1×4 (50-100 mesh) strong base anion exchange resin. The resin was received in the chloride form. It was poured into a 42 ml column, that was 24 cm long and 1.5 cm diameter. The resin was conditioned with 4 bed volumes of feed, which contained 50 g/L of ammonium bisulfate. This conditioning was required because the resin was new. The resin was then washed with water until a neutral pH was detected at the column exit.

The ammonium bisulfate decomposition product from Example 1, which was almost entirely ammonium bisulfate, was diluted to a solids concentration of 50 g/L and then added to the column at a feed rate of 6 ml/minute. The column was at ambient temperature. Eluent from the column was collected in 10 ml fractions. The results of the elution are shown in FIG. 1. For the first 0.5 bed volume, water in the void eluted. After this, ammonia eluted at about 80%-85% of the feed concentration, which is consistent with the notion that ammonium salts have little affinity for this resin. The sulfate concentration in the effluent remained at about 40% to 45% of the feed sulfate concentration through 2.0 bed volumes. The pH of the eluent between 0.75 and 2.0 bed volumes of about pH 6.0 indicates that ammonium sulfate eluted at this stage. After 2.0 feed bed volumes, the pH drops at the column exit and the sulfate concentration increases. This indicates the breakthrough of sulfuric acid, as the resin has reached its saturation. The feed is stopped at this point.

Figure 2:
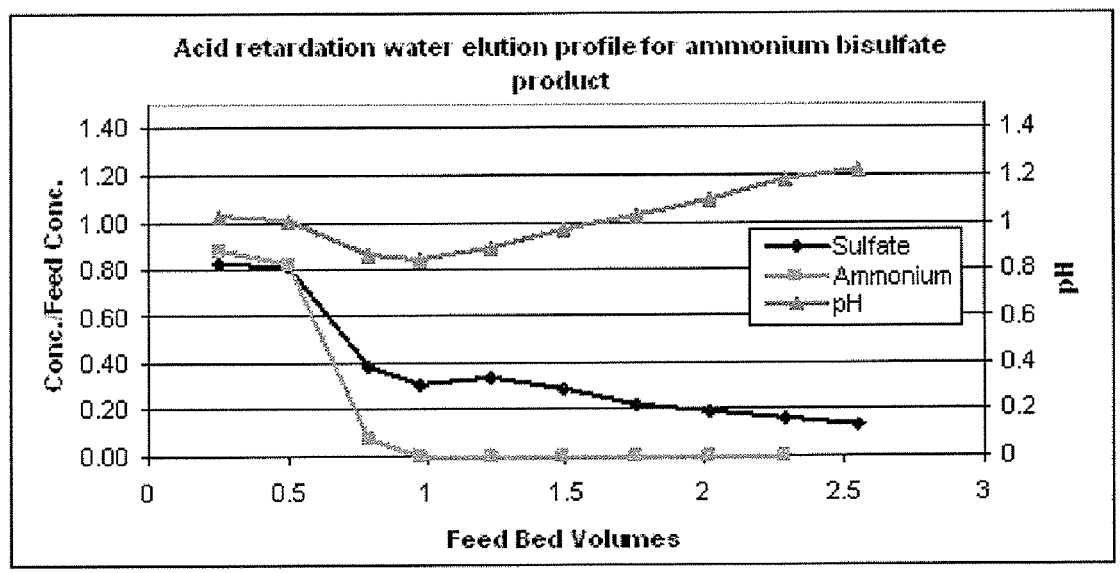
FIG. 2 shows the sulfate, ammonium and pH elution profiles from the strong anion exchange resin of FIG. 1 after co-current desorption of sulfuric acid remaining bound to the column with water.

The sulfuric acid remaining bound to the column was then desorbed with water. In this case, water desorption was co-current; however, it will be understood that counter-current or cross-current desorption can alternatively be employed. The results are shown in FIG. 2. The low pH and absence of ammonium indicates the elution of sulfuric acid. The ammonia in the column void elutes within the first 1.2 bed volumes. After that, the sulfuric acid product elutes, which is of high purity.

Figure 3:
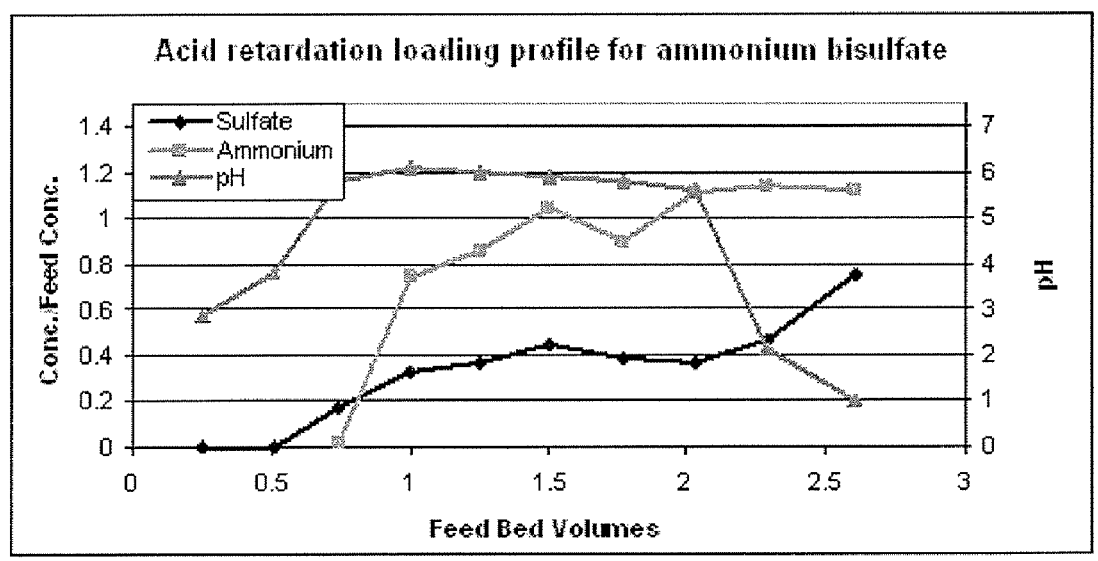
FIG. 3 shows the sulfate, ammonium and pH loading profiles from a column utilized in an acid retardation process comprising a strong anion exchange resin with ammonium bisulfate as the feed. The feed was stopped upon breakthrough of sulfuric acid. Pure ammonium bisulfate was used as the feed to the column.
Figure 4:
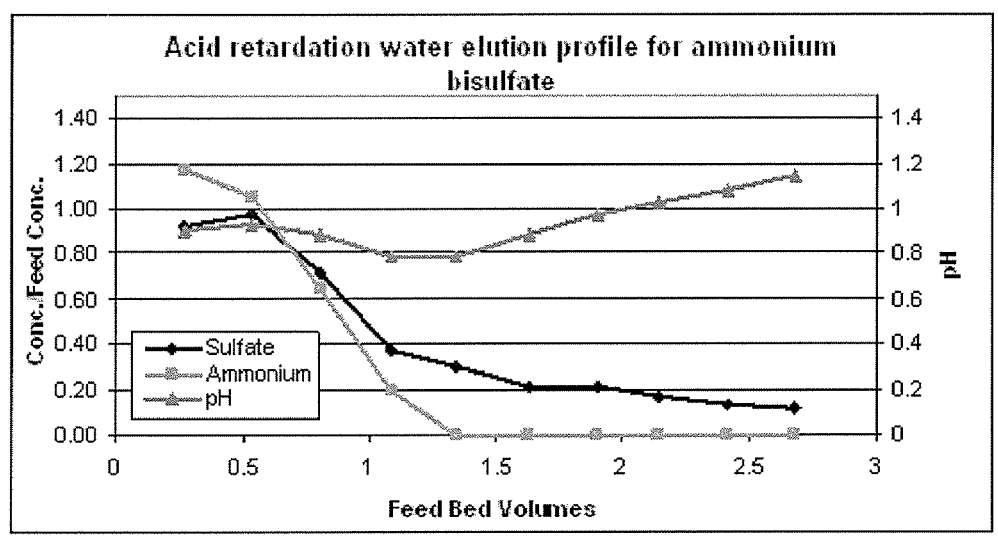
FIG. 4 shows the sulfate, ammonium and pH elution profiles from the strong anion exchange resin of FIG. 3 after co-current desorption of sulfuric acid remaining bound to the column with water.

Further evidence of the good separation of ammonium bisulfate into ammonium sulfate and sulfuric acid is found in FIGS. 3 and 4, which result from the same procedures as above, but use pure ammonium bisulfate as the feed to the acid retardation system. The results are very similar to those obtained using the product of the thermal reaction as the feed to the acid retardation system.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A process for producing ammonia and sulfuric acid from a first stream comprising ammonium sulfate, the process comprising the steps of:
   (i) heating the first stream comprising ammonium sulfate thereby producing ammonia and a decomposition product comprising sulfate salt selected from the group consisting of bisulfate salt, pyrosulfate salt and a combination thereof;
   (ii) recovering the ammonia produced in step (i);
   (iii) adding water to the decomposition product produced in step (i) to produce a second stream comprising a chemical selected from the group consisting of sulfate salt, bisulfate salt, sulfuric acid and a combination thereof;
   (iv) separating sulfate salt from sulfuric acid in the second stream produced in step (iii) to obtain a third stream comprising sulfuric acid and a fourth stream comprising one or more than one sulfate salt, wherein said separating comprises acid retardation; and (v) recovering the sulfuric acid obtained in step (iv),
wherein the first stream comprising ammonium sulfate originates from a stream produced by pretreatment of a lignocellulosic feedstock with sulfuric acid and wherein sulfate present in the stream comprising ammonium sulfate originates, in whole or in part, from sulfuric acid added during said pretreatment.

2. The process of claim 1, further comprising using ammonia recovered in step (ii) to adjust the pH of said stream produced by pretreating said lignocellulosic feedstock with sulfuric acid.

3. The process of claim 1, wherein said sulfuric acid added during pretreatment is obtained from step (v).

4. The process of claim 1, wherein the one or more than one sulfate salt produced in step (iv), or a portion thereof, is added to the first stream comprising ammonium sulfate in the step of heating (step (i)).

5. The process of claim 1, wherein the first stream comprising ammonium sulfate further comprises a sulfate salt selected from the group consisting of potassium sulfate, sodium sulfate, magnesium sulfate, calcium sulfate and a combination thereof.

6. The process of claim 5, wherein the first stream comprising ammonium sulfate further comprises potassium sulfate.

7. The process of claim 1, wherein the decomposition product produced in step (i) comprises a bisulfate salt selected from the group consisting of ammonium bisulfate, potassium bisulfate, sodium bisulfate, magnesium bisulfate, calcium bisulfate and a combination thereof.

8. The process of claim 7, wherein the bisulfate salt comprises ammonium bisulfate.

9. The process of claim 7, wherein the bisulfate salt comprises potassium bisulfate.

10. The process of claim 1, wherein the decomposition product produced in step (i) comprises a pyrosulfate salt selected from the group consisting of ammonium pyrosulfate, potassium pyrosulfate, sodium pyrosulfate, magnesium pyrosulfate, calcium pyrosulfate and a combination thereof.

11. The process of claim 10, wherein the decomposition product comprises ammonium pyrosulfate.

12. The process of claim 10, wherein the decomposition product comprises potassium pyrosulfate.

13. The process of claim 1, wherein the one or more than one sulfate salt in step (iv) is selected from the group consisting of ammonium sulfate, potassium sulfate, magnesium sulfate, calcium sulfate and a combination thereof.

14. The process of claim 13, wherein the one or more than one sulfate salt in step (iv) comprises ammonium sulfate.

15. The process of claim 13, wherein the one or more than one sulfate salt in step (iv) comprises potassium sulfate.

16. The process of claim 1, wherein the step of heating the first stream comprising ammonium sulfate (step (i)) is carried out at a temperature of between about 300° C. and about 450° C.

17. The process of claim 1, wherein the second stream has a dissolved solids concentration of about 25 g/L to about 500 g/L.

18. A process for producing ammonia and sulfuric acid from a first stream comprising ammonium sulfate, the process comprising the steps of:
(i) heating the first stream comprising ammonium sulfate thereby producing ammonia and a decomposition product comprising sulfate salt selected from the group consisting of bisulfate salt, pyrosulfate salt and a combination thereof;
(ii) recovering the ammonia produced in step (i);
(iii) adding water to the decomposition product produced in step (i) to produce a second stream comprising a chemical selected from the group consisting of sulfate salt, bisulfate salt, sulfuric acid and a combination thereof;
(iv) separating sulfate salt from sulfuric acid in the second stream produced in step (iii) to obtain a third stream comprising sulfuric acid and a fourth stream comprising one or more than one sulfate salt, wherein said separating comprises acid retardation; and
(v) recovering the sulfuric acid obtained in step (iv),
wherein the first stream comprising ammonium sulfate originates from a stream produced by pretreatment of a lignocellulosic feedstock with ammonia and wherein ammonia present in the stream comprising ammonium sulfate originates, in whole or in part, from ammonia added during said pretreatment.

19. The process of claim 18, further comprising using the sulfuric acid recovered in step (v) to adjust the pH of said stream produced by pretreating said lignocellulosic feedstock with ammonia.

20. The process of claim 18, wherein said ammonia added during pretreatment is obtained from step (ii).

21. The process of claim 18, wherein the one or more than one sulfate salt produced in step (iv), or a portion thereof, is added to the first stream comprising ammonium sulfate in the step of heating (step (i)).

22. The process of claim 18, wherein the first stream comprising ammonium sulfate further comprises a sulfate salt selected from the group consisting of potassium sulfate, sodium sulfate, magnesium sulfate, calcium sulfate and a combination thereof.

23. The process of claim 22, wherein the first stream comprising ammonium sulfate further comprises potassium sulfate.

24. The process of claim 18, wherein the decomposition product produced in step (i) comprises a bisulfate salt selected from the group consisting of ammonium bisulfate, potassium bisulfate, sodium bisulfate, magnesium bisulfate, calcium bisulfate and a combination thereof.

25. The process of claim 24, wherein the bisulfate salt comprises ammonium bisulfate.

26. The process of claim 24, wherein the bisulfate salt comprises potassium bisulfate.

27. The process of claim 18, wherein the decomposition product produced in step (i) comprises a pyrosulfate salt selected from the group consisting of ammonium pyrosulfate, potassium pyrosulfate, sodium pyrosulfate, magnesium pyrosulfate, calcium pyrosulfate and a combination thereof.

28. The process of claim 27, wherein the decomposition product comprises ammonium pyrosulfate.

29. The process of claim 27, wherein the decomposition product comprises potassium pyrosulfate.

30. The process of claim 18, wherein the one or more than one sulfate salt in step (iv) is selected from the group consisting of ammonium sulfate, potassium sulfate, magnesium sulfate, calcium sulfate and a combination thereof.

31. The process of claim 30, wherein the one or more than one sulfate salt in step (iv) comprises ammonium sulfate.

32. The process of claim 30, wherein the one or more than one sulfate salt in step (iv) comprises potassium sulfate.

33. The process of claim 18, wherein the step of heating the first stream comprising ammonium sulfate (step (i)) is carried out at a temperature of between about 300° C. and about 450° C.

34. The process of claim 18, wherein the second stream has a dissolved solids concentration of about 25 g/L to about 500 g/L.

35. A process for producing ammonia and sulfuric acid from a first stream comprising ammonium sulfate, the process comprising the steps of:
(i) heating the first stream comprising ammonium sulfate thereby producing ammonia and a decomposition product comprising sulfate salt selected from the group consisting of bisulfate salt, pyrosulfate salt and a combination thereof;
(ii) recovering the ammonia produced in step (i);
(iii) adding water to the decomposition product produced in step (i) to produce a second stream comprising a chemical selected from the group consisting of sulfate salt, bisulfate salt, sulfuric acid and a combination thereof;
(iv) separating sulfate salt from sulfuric acid in the second stream produced in step (iii) to obtain a third stream comprising sulfuric acid and a fourth stream comprising one or more than one sulfate salt, wherein said separating comprises acid retardation; and
(v) recovering the sulfuric acid obtained in step (iv),
wherein the first stream comprising ammonium sulfate originates from a stream produced by acid hydrolysis of a lignocellulosic feedstock with sulfuric acid and wherein sulfate present in the stream comprising ammonium sulfate originates, in whole or in part, from sulfuric acid added during said acid hydrolysis.

36. The process of claim 35, wherein the one or more than one sulfate salt produced in step (iv), or a portion thereof, is added to the first stream comprising ammonium sulfate in the step of heating (step (i)).

37. The process of claim 35, wherein the first stream comprising ammonium sulfate further comprises a sulfate salt selected from the group consisting of potassium sulfate, sodium sulfate, magnesium sulfate, calcium sulfate and a combination thereof.

38. The process of claim 37, wherein the first stream comprising ammonium sulfate further comprises potassium sulfate.

39. The process of claim 35, wherein the decomposition product produced in step (i) comprises a bisulfate salt selected from the group consisting of ammonium bisulfate, potassium bisulfate, sodium bisulfate, magnesium bisulfate, calcium bisulfate and a combination thereof.

40. The process of claim 39, wherein the bisulfate salt comprises ammonium bisulfate.

41. The process of claim 39, wherein the bisulfate salt comprises potassium bisulfate.

42. The process of claim 35, wherein the decomposition product produced in step (i) comprises a pyrosulfate salt selected from the group consisting of ammonium pyrosulfate, potassium pyrosulfate, sodium pyrosulfate, magnesium pyrosulfate, calcium pyrosulfate and a combination thereof.

43. The process of claim 42, wherein the decomposition product comprises ammonium pyrosulfate.

44. The process of claim 42, wherein the decomposition product comprises potassium pyrosulfate.

45. The process of claim 35, wherein the one or more than one sulfate salt in step (iv) is selected from the group consisting of ammonium sulfate, potassium sulfate, magnesium sulfate, calcium sulfate and a combination thereof.

46. The process of claim 45, wherein the one or more than one sulfate salt in step (iv) comprises ammonium sulfate.

47. The process of claim 45, wherein the one or more than one sulfate salt in step (iv) comprises potassium sulfate.

48. The process of claim 35, wherein the step of heating the first stream comprising ammonium sulfate (step (i)) is carried out at a temperature of between about 300° C. and about 450° C.

49. The process of claim 35, wherein the second stream has a dissolved solids concentration of about 25 g/L to about 500 g/L.

50. A process for producing ammonia and sulfuric acid from a first stream comprising ammonium sulfate, the process comprising the steps of:
(i) heating the first stream comprising ammonium sulfate thereby producing ammonia and a decomposition product comprising sulfate salt selected from the group consisting of bisulfate salt, pyrosulfate salt and a combination thereof;
(ii) recovering the ammonia produced in step (i);
(iii) adding water to the decomposition product produced in step (i) to produce a second stream comprising a chemical selected from the group consisting of sulfate salt, bisulfate salt, sulfuric acid and a combination thereof;
(iv) separating sulfate salt from sulfuric acid in the second stream produced in step (iii) to obtain a third stream comprising sulfuric acid and a fourth stream comprising one or more than one sulfate salt, wherein said separating comprises acid retardation; and
(v) recovering the sulfuric acid obtained in step (iv),
wherein the second stream has a dissolved solids concentration of about 25 g/L to about 500 g/L.

51. The process of claim 50, wherein the step of heating the first stream comprising ammonium sulfate (step (i)) is carried out at a temperature of between about 300° C. and about 450° C.

52. A process for producing ammonia and sulfuric acid from a first stream comprising ammonium sulfate, the process comprising the steps of:
(i) heating the first stream comprising ammonium sulfate thereby producing ammonia and a decomposition product comprising a pyrosulfate salt, which pyrosulfate salt is selected from the group consisting of ammonium pyrosulfate, potassium pyrosulfate, sodium pyrosulfate, magnesium pyrosulfate, calcium pyrosulfate and a combination thereof;
(ii) recovering the ammonia produced in step (i);
(iii) adding water to the decomposition product produced in step (i) to produce a second stream comprising a chemical selected from the group consisting of sulfate salt, bisulfate salt, sulfuric acid and a combination thereof;
(iv) separating sulfate salt from sulfuric acid in the second stream produced in step (iii) to obtain a third stream comprising sulfuric acid and a fourth stream comprising one or more than one sulfate salt, wherein said separating comprises acid retardation; and
(v) recovering the sulfuric acid obtained in step (iv).

53. The process of claim 52, wherein the step of heating the first stream comprising ammonium sulfate (step (i)) is carried out at a temperature of between about 300° C. and about 450° C.

* * * * *